United States Patent [19]

Takaishi et al.

[11] Patent Number: 4,691,584

[45] Date of Patent: Sep. 8, 1987

[54] ACTUATOR FOR REMOTE DEVICES OR THE LIKE

[75] Inventors: Tatsuyuki Takaishi, Yokohama; Fumio Kobayashi, Ayase; Keizaburo Usui; Tsutomu Kagiyama, both of Yokohama, all of Japan

[73] Assignee: Ohi Seisakusho Co., Ltd., Yokohama, Japan

[21] Appl. No.: 829,029

[22] Filed: Feb. 14, 1986

[30] Foreign Application Priority Data

Feb. 20, 1985 [JP] Japan .................................. 60-30569
Apr. 19, 1985 [JP] Japan .................................. 60-82222

[51] Int. Cl.⁴ .......................... G05G 9/00; F16C 1/10
[52] U.S. Cl. ................................ 74/471 R; 74/501 R
[58] Field of Search ............. 74/471 R, 501 R, 501 A

[56] References Cited

U.S. PATENT DOCUMENTS

| 3,266,328 | 8/1966 | Rott .................................. 74/501 A |
| 3,605,932 | 9/1971 | Wilfert et al. ................. 74/501 A X |
| 4,170,147 | 10/1979 | Durno et al. ................. 74/501 R X |
| 4,320,673 | 3/1982 | Wegert ......................... 74/501 A X |
| 4,374,597 | 2/1983 | Mochida ....................... 74/471 R X |
| 4,467,668 | 8/1984 | Tatch ............................ 74/501 A X |
| 4,526,057 | 7/1985 | Mochida et al. ............. 74/471 R X |

FOREIGN PATENT DOCUMENTS 59-141677  8/1984  Japan .
60-220242 11/1985  Japan .

Primary Examiner—Dennis L. Taylor
Attorney, Agent, or Firm—Schwartz, Jeffery, Schwaab, Mack, Blumenthal & Evans

[57] ABSTRACT

In order to render an actuator which is capable of selectively operating two remotely arranged latches or the like devices highly compact, the device is provided with a reversible motor, a reduction gear and a clutch arrangement which includes a solenoid coil. In some embodiments the clutch includes a two stage arrangement which permits a small power economical solenoid arrangement to be used. The invention further features the use of a compact reduction gear which includes two ring gears and stepped pinion gears.

13 Claims, 20 Drawing Figures

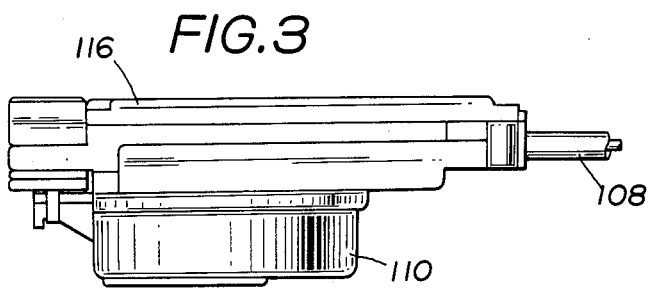
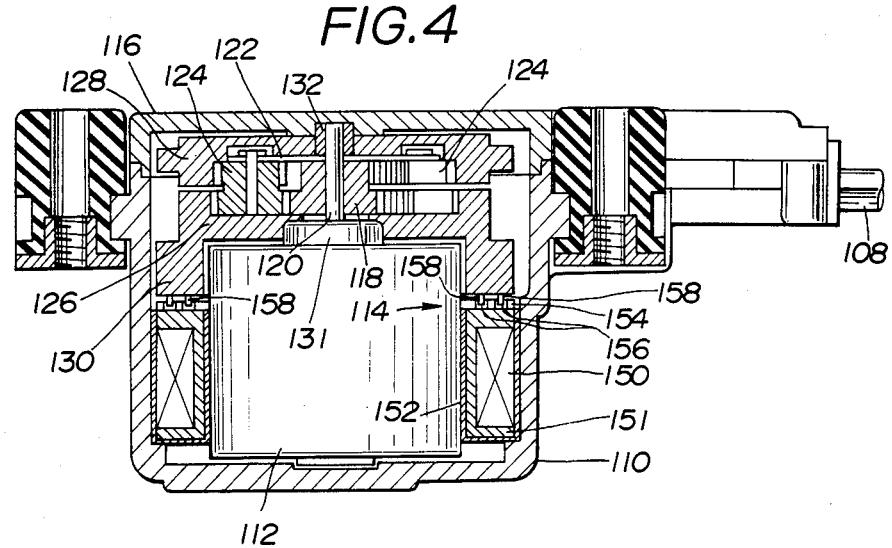
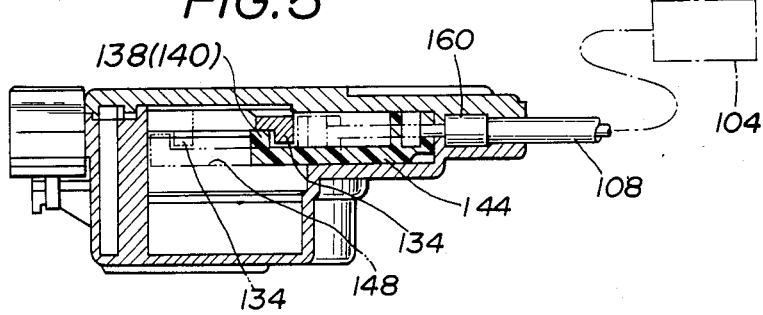

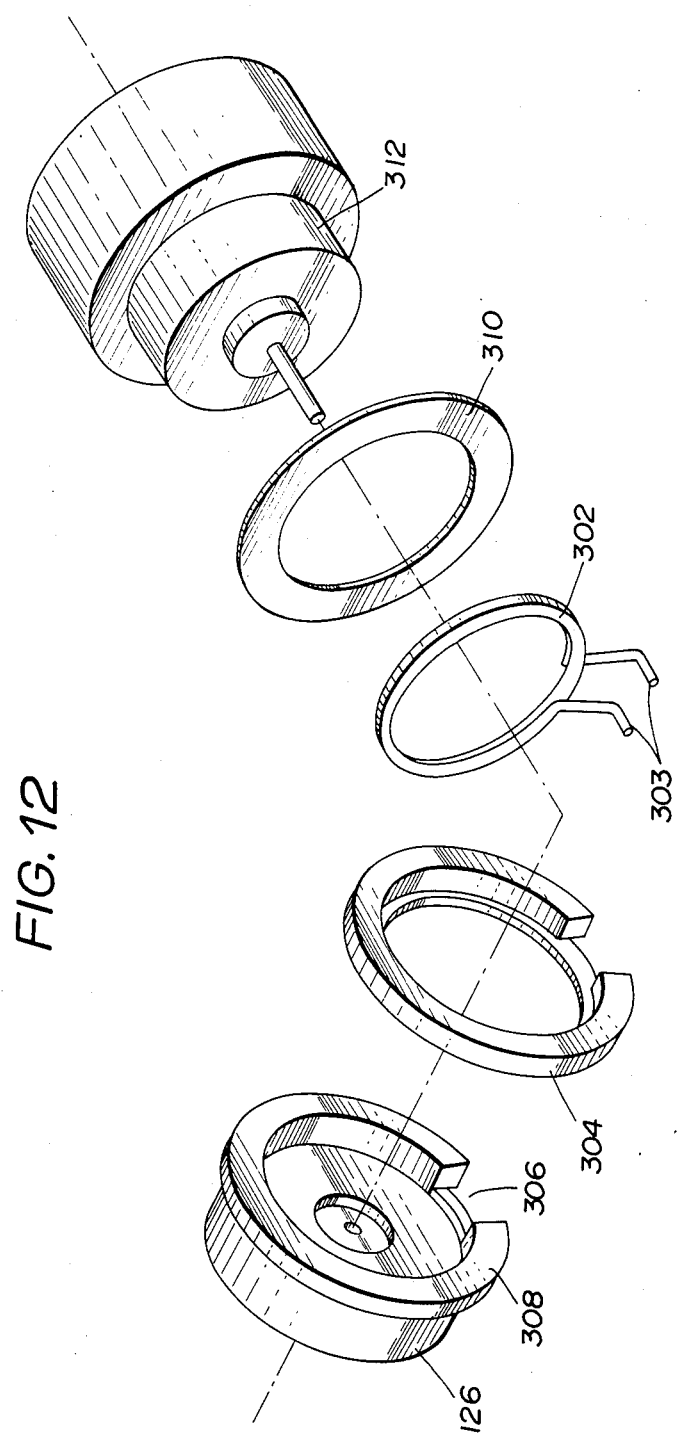

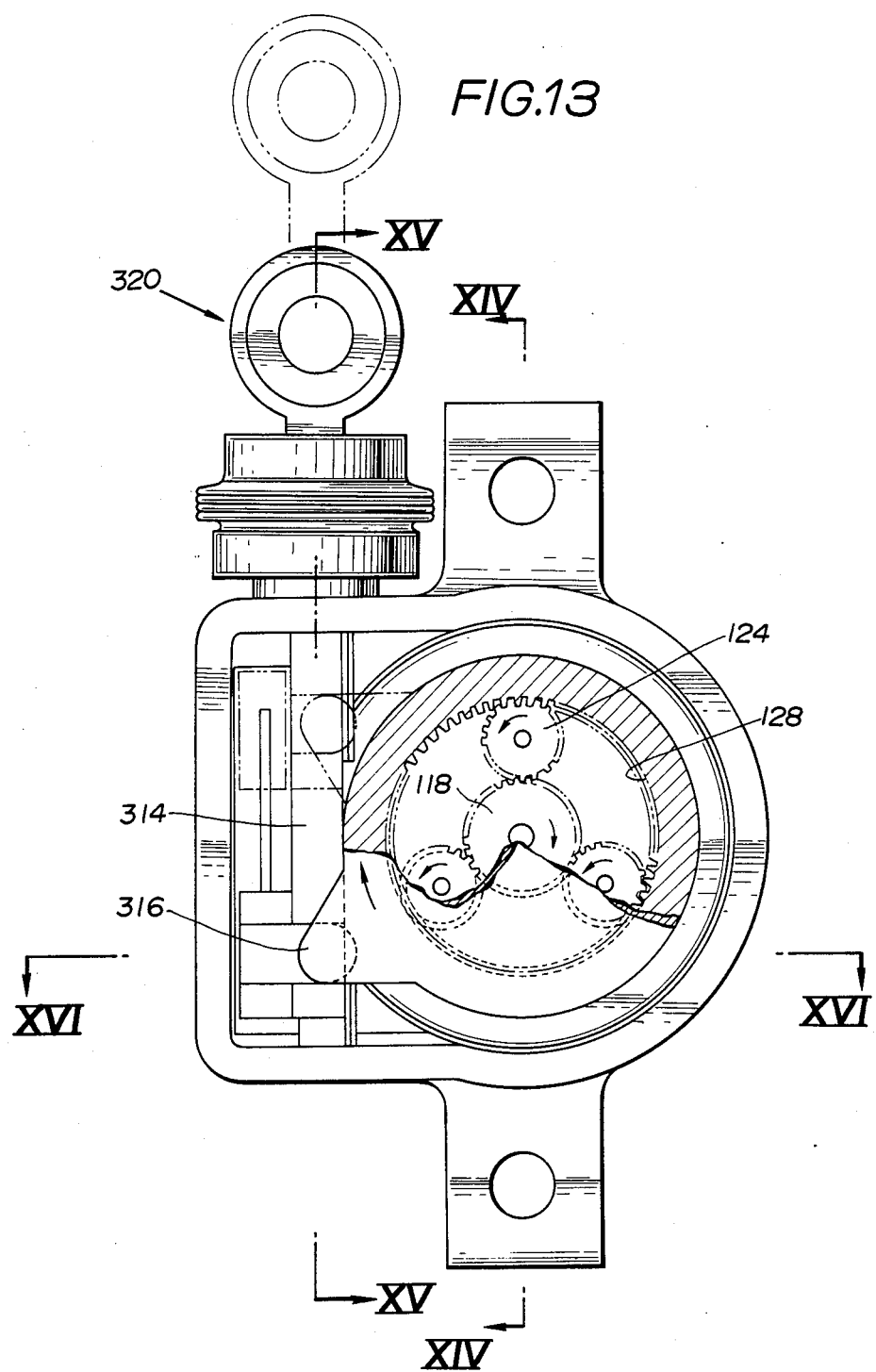

ACTUATOR FOR REMOTE DEVICES OR THE LIKE

BACKGROUND OF THE INVENTION

1. Field of the Invention

The present invention relates generally to an actuator for selectively operating one or more remotely disposed devices and more specifically to such an actuator which is highly compact, requires relatively little power and which is particularly suited for use in automotive vehicles and the like.

2. Description of the Prior Art

FIG. 1 of the drawings shows a previously proposed arrangement via which two separate remote latch mechanisms or devices 1, 2 can be operated by a single control unit 3. As sbown, this arrangement includes a pivotally mounted plate 4 in which an arcute slot 6 is formed. A manually operable lever 8 is connected to tbe plate 4 for inducing pivotal movement thereof.

The ends of the wires or similar flexible cable members 10, 12 (such as the inner members of a Bowden cable) are slidably received in the arcuate slot 6 in a manner that lost motion connections are defined. With this arrangement when the lever 8 is rotated in the direction indicated by "L" only cable 12 is drawn in a manner which selectively releases latch 2 while the end of the cable 10 interconnecting the control unit 3 and the latch device 1 is permitted to slide in the slot toward the end of the cable being drawn away from latch 2; and vice versa.

To ensure that the manually operable lever 8 returns to a predetermined neutral position after being released, springs 14, 16 are connected to the plate 4 as shown.

This arrangement while being simple, suffers from the drawbacks that if the stroke of the cables required to operate the latches is relatively long the size, (e.g. radius) of the plate 4 and/or the angle through which it must be pivoted increases proportionally and the control unit 3 becomes overly large and bulky and therefore difficult to dispose in a convenient location within the passenger compartment of an automotive vehicle or the like.

Further, as the path along which the ends of the cables 10, 12 are drawn is arcuate difficulties have been experienced in arranging the cables with respect to the plate. Viz., the cables 10, 12 tend to project out from the control unit 3 in essentially diametrically opposed directions. This of course further hampers location of the control unit 3 as space is required to permit the cables to be lead in a concealed manner away from the control unit to the respective latch devices 1, 2 associated therewith.

SUMMARY OF THE INVENTION

It is an object of the present invention to provided an actuator arrangement which is both compact and easy to disposed in the confines of a vehicle passenger compartment of the like.

These objects are achieved by an arrangement wherein the device is provided with a reversible motor, a reduction gear and an clutch arrangement which includes a solenoid coil. In some embodiments the clutch includes a two stage arrangement which permits a small power economical solenoid arrangement to be used. The invention further features the use of a compact reduction gear which includes two ring gears and stepped pinion gears.

More specifically, a first aspect of the present invention comes in of an actuator for operating a remote device comprising; a rotatable member; a motor having a shaft, the motor being energizable to drive the shaft in first and second rotational directions; a reduction gear operatively interposed between the motor and the rotatable member; and a clutch; the reduction gear comprising: a first ring gear operatively connected with the clutch for being selectively rendered stationary with respect to a housing of the actuator; a second ring gear connected with the rotatable member for rotation therewith; a carrier; pinion gears rotatably supported on the carrier, the pinion gears each having a first section which meshes with the first ring gear and a second portion which meshes with the second ring gear; and a sun gear, the sun gear being in drive connection with the shaft of the motor.

A second aspect of the present invention comes in an actuator for operating a remote device comprising: a rotatable member; a motor having a shaft, the motor being energizable to drive the shaft in first and second rotational directions; a reduction gear operatively interposed between the motor and the rotatable member; and a clutch which selectively establishes a drive connection between the rotatable member and the shaft through the reduction gear when engaged, the clutch comprising: a first rotatable element, the first element being connected with a gear element of the reduction gear; a second rotatable element; means for selectively connecting the second element with a stationary structure of the actuator; a resilient member arranged with the first and second elements so that mutual rotation between the first and second elements causes the resilient member to distort and engage said stationary structure in a manner which renders said first element stationary until said selectively connecting means renders said second rotatable element rotatable with respect to said stationary structure of said actuator.

A third aspect of the present invention comes in an actuator for operating first and second remote devices, comprising: a rotatable member; a first flexible cable, the first flexible cable having a first end operatively connected to the rotatable member and a second end operatively connected to the first remote device; a second flexible cable, the second cable having a first end operatively connected with the rotatable member and a second end operatively connected with the second remote device; the first and second cables being operatively connected at their respective first ends to the rotatable member in a manner that rotation of the rotational member in a first rotational direction causes the first cable be moved in a direction which activates the first remote device and rotation of the rotatable member member in a second rotational direction causes the second cable to moved in a direction which activates the second device; and a motor arrangement operatively connected with the rotatable member, the motor arrangement being selectively energizable to drive the rotatable member in the first and second rotational directions.

BRIEF DESCRIPTION OF THE DRAWINGS

The features and advantages of the arrangement of the present invention will become more clearly appreciated from the following description taken in conjunction with the appended drawings in which:

FIG. 3 is a side elevation of the control unit shown in FIG. 2;

FIG. 4 is a vertical section taken along section line IV—IV of FIG. 2;

FIG. 5 is a vertical section taken along section line V—V of FIG. 2;

FIG. 12 is an exploded view of a clutch arrangement of a third embodiment of the present invention;

FIG. 13 is partially sectioned plan view of a third embodiment of the present invention;

DETAILED DESCRIPTION OF THE PREFERRED EMBODIMENTS

Figure 1:
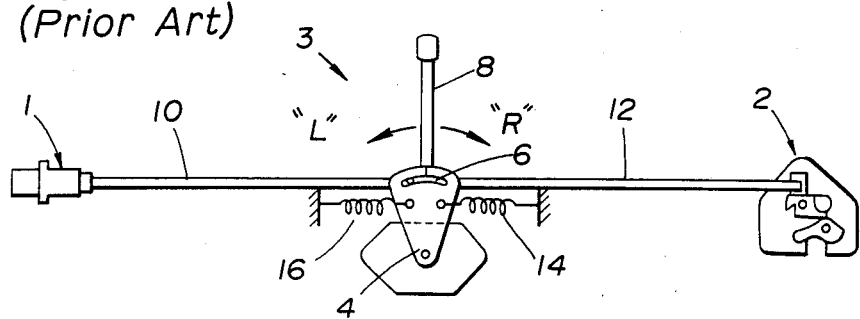
FIG. 1 shows in schematic form the prior art arrangement discussed in the opening paragraphs of the instant disclosure.

FIGS. 2 to 5 show a first embodiment of the present invention. In this arrangement a control unit 100 is operatively connected with first and second latch mechanisms 102, 104 by means of Bowden cables 106, 108. By way of the example only, the first latch device 102 is arranged to lock a vehicle gasoline filler cover, while the second device 104 is arranged to lock the trunk lid of the vehicle.

It will be noted that although the disclosure is directed to the control of latch devices it is possible to use the control unit which characterizes the present invention in any number of different situations and with a variety of remote mechanically operable devices.

In the first embodiment the control unit consists of a cup-shaped housing 110 in which a reversible electric motor 112 and clutch arrangement 114 are disposed. A cap-like cover member 116 is releasably connected to the housing 110 and encloses part of a step-down gearing and a tractive arrangement which selectively draws the inners of the Bowden cables into the control unit in a manner which selectively activates the latches.

As best seen in FIG. 4, the step-down gearing in the first embodiment takes the form a plantary gear unit wherein the sun gear 118 is slidably received on the ouput shaft 120 of the reversible electric motor. As this shaft functions as the input shaft of the planetary gear unit, this shaft will be referred to as an "input shaft" hereinafter. This shaft is formed with opposed flat surfaces which cooperate with corresponding surfaces formed along the coaxial bore of the sun gear 118 in a manner which causes the sun gear to rotate synchronously therewith. A carrier 122 on which a plurality (3) "double" pinion gears 124 (viz., stepped pinion gears each having two different diameter portions) are rotatably supported), is rotatably supported on the input shaft 120 in a manner that the larger diameter section of each of the pinion gears mesh with the sun gear 118. The planetary gear contains two ring gears 126, 128. The first ring gear 126 is arranged to mesh with the above mentioned larger diameter portions of the pinion gears 124 and formed with coaxially extending annular flange 130 which forms part of the clutch arrangement which will be described in detail hereinlater. This member of the planetary gear is suported on a boss 131 provided on top of the motor 112. As shown, the first ring gear 126 is arranged to slidably support the sun gear and pinion gears on the upper surface thereof.

The second ring gear 128 is arranged to be housed in the cap or cover member 116 and mesh with the upper smaller diameter sections of the pinion gears 124.

An annular bearing 132 is disposed coaxially through a bore formed in the second sun gear 128 and arranged to seat in a suitable recess formed in the cap or or cover member 116. As shown, the input shaft 120 is received in this bearing 132 and thus securely supported against lateral thrust or the like which might be generated during operation of the device.

Figure 2:
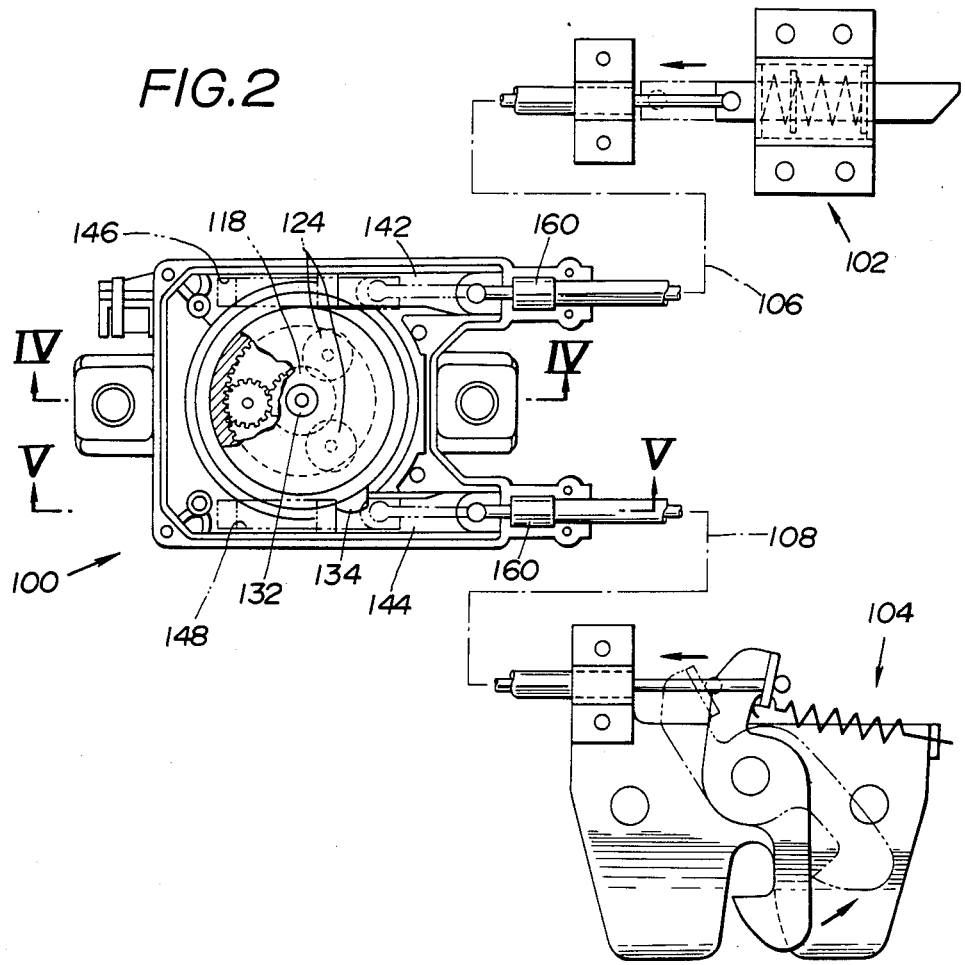
FIG. 2 is a particlly sectional plan view of a first embodiment of the present invention.

The second ring gear 128 is formed with a lug 134 which extends downwardly and is engageable with upwardly extending flanges 138, 140 formed at the ends of slide members 142, 144. The slide members 142, 144, as shown in FIG. 2, are connected to the inners of the Bowden cables 106, 108 and arranged to slide along channel-like tracks 146, 148 formed in the cap member 116. With this arrangement, as shown in FIG. 5, upon the second ring gear 128 being rotated in the clockwise direction (as seen in FIG. 2) lug 136 engages the flange 146 of the slide member 144 in a manner which drives same along the track 148. As the end of the inner of the Bowden cable 108 is connected to the slide member 142 the inner is drawn away from the second latch member 104 actuating the same. During this time as lug 134 rotates away from the flange 140 of slide member 144, the latter remains in its home position and no actuation of the first latch device 102 occurs.

On the other hand, in the event that the second ring gear 128 rotates in the counterclockwise direction, the reverse situation occurs wherein the second latch device 104 is selectively released.

The clutch arrangement 114 which secures the first ring gear 126 in position during operation of the device comprises a solenoid coil 150 which is wound on a suitable bobbin 151 and disposed about the periphery of the motor 112 proper. The coil and bobbin 150, 151 are disposed in a field core 152 as shown. An annular armature member 154 is disposed on top of the bobbin 151 so as rotatable with respect thereto. This washer-like member 154 is made of an ferromagnetic material and formed with two annular rows of apertures 156. The downwardly extending annular flange 130 of the first ring gear 126 is formed with a series of pins 158 which depend therefrom and which are slidably received in the apertures 156 formed in the armature 154. In this embodiment, the armature 154 and flange 130 are arranged so as to provided a small amount of play therebetween which permits the armature to move toward and away from the bottom of the flange. When the solenoid coil 150 is energized the armature 154 is attracted downwardly as seen in the drawings and prevented from rotating (viz., rendered stationary). This prevents the first ring gear 126 from rotating within the housing 110.

As will be appreciated, until the solenoid coil 150 is energized, even if the motor 112 is supplied with electrical power the only bias which acts on the ring gears 126, 128 is the bias which acts on the second ring gear 128. Viz., the bias which is applied by the spring or springs of the remote devices and which acts through the cables interconnecting the same. Hence, under such conditions the second ring gear tends to be held stationary while the first ring gear 126 rotates freely. However, upon the first ring gear 126 being rendered stationary under the influence of the clutch arrangement 114, a reaction between the pinion gears 124 and the first ring gear 126 occurs. Viz., if the motor 112 is energized in a manner which causes the input shaft 120 to rotate in the clockwise direction (for example) the carrier 122 is driven to rotate in the same direction. Under these conditions the second ring gear 128 is caused to rotate in the counter-clockwise direction but with a substantial speed reduction. The reduced diameter of the portions of the pinions 124 which mesh with the second ring gear 128 add to the reduction.

Hence, with the step down effect possible with the above described gear arrangement it is possible to use a small motor which produces relatively little power and still apply power smoothly to the slide members.

Upon release of the intended device the supply of electrical power to the clutch and motor arrangement is terminated. This may be effected by providing a limit switch or switches (not shown) which detects a predetermined travel of the inner under traction. Such switches may be provided at the ends of the channel-like tracks 146, 148 distal from the ends at which the slide members assume their home (non-activating positions). Under these conditions as the clutch renders the first ring gear rotatable the source of reaction which permits the second ring gear to be rotatably driven is removed. This permits the slide member which has been driven via enagement with the lug 134 from its home position to its release position under the influence of the spring or springs provided in the device which has just been released.

In this embodiment the cup-shaped housing 110 and the cap member 116 formed with recesses which receive sleeve-like guides 160 through which the inners of the Bowden cables are slidably disposed. As will be appreciated from FIG. 5 these guides 160 guide the inners in a direction essentially tangential with respect to the axis of rotation of the ring gears 126, 128. To further facilitate easy assembly the slide members 142, 144 are formed with shaped recess which snugly receive beads formed on the ends of the inners. As will be appreciated, the slide members 142, 144, guides 160 etc., can be placed in position and the cap 116 simply secured in place to complete assembly.

It will be further appreciated that the ring and pinion gears of the planetary gear train can be formed of a suitable plastic such as a polypropylene or the like, both from the point of ease of manufacture (e.g. injection moulding) and quiet running.

SECOND EMBODIMENT

FIGS. 6 to 11 show a second embodiment of the present invention. This arrangement includes an essentially circular disc-like rotatable member 202 which is rotatably supported on a pin 204 member disposed through an aperture formed in the cap member 206 which closes the top of the housing 208. This pin 204 is formed with two flat surfaces which cooperate with corresponding surfaces formed in the aperture and thus held stationary with respect to the housing. A washer 210 is disposed between the rotatable member and the inner surface of cap 206. The pin member 204 is further formed with a radial flange 212 which retains the rotatable member 202 is position within the cap 204 and further formed with a blind coaxial bore (no numeral) for receiving the end of the output shaft 214 of the reversible motor 216. In this embodiment also the motor output shaft will be referred to as the "input shaft" of the planetary gear unit.

The rotatable member 202 is formed with a first narrow cross-section recess 218 about part of the periphery thereof and a cut-out like larger cross-section recess 202 which extends about the remainder of the periphery. In this embodiment the recess 218 is arranged to be slightly larger in cross-section than the cross section of the inners of the Bowden cables which lead from the actuator to the remote control devices; while the cross section of recess 220 is arranged to be larger than that of the beads or stoppers 222 attached to the terminal ends of the inners.

Figure 6:
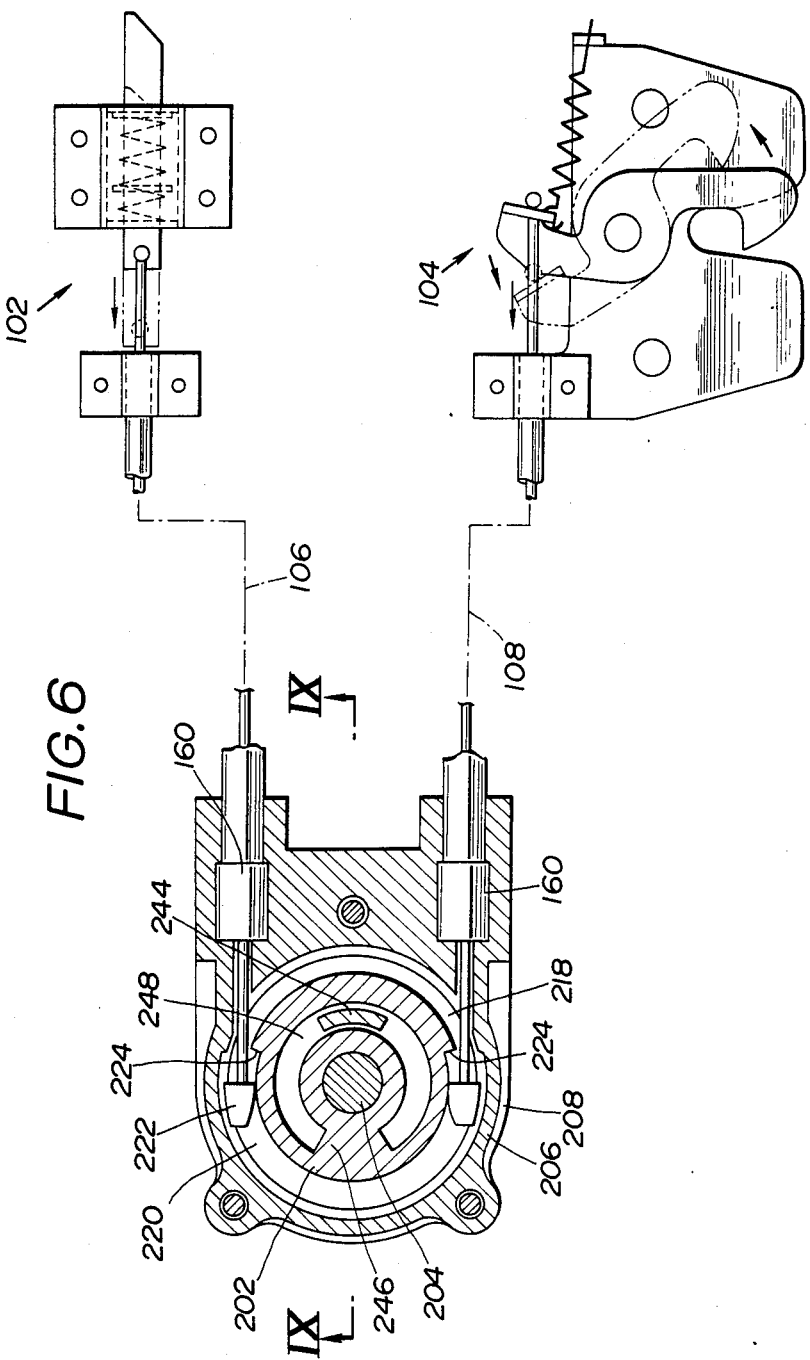
FIG. 6 is a sectional plan view of a second embodiment of the present invention.
Figure 7:
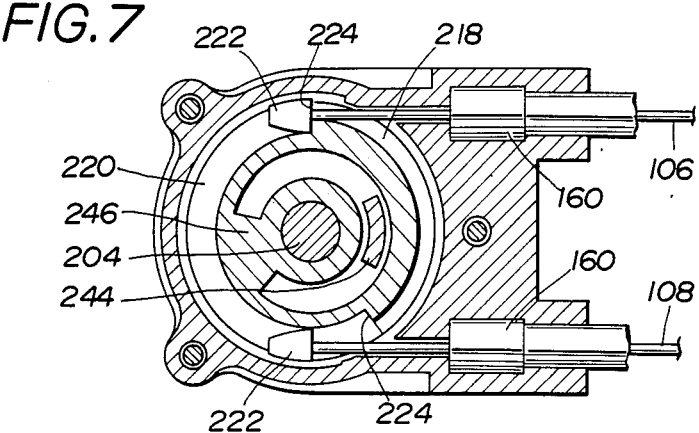
FIG. 7 is a sectional plan view showing the actuator in a rest or neutral condition.

This arrangement as best seen in FIG. 6 defines steps or shoulders 224 which can engage the beads 222 and selectively pull one of the inners onto the rotatable member in a manner that it is received in the recess and wound onto the rotatable member. This of course pulls the inner in an activating direction away from the respective device to which it is operatively connected.

Figure 9:
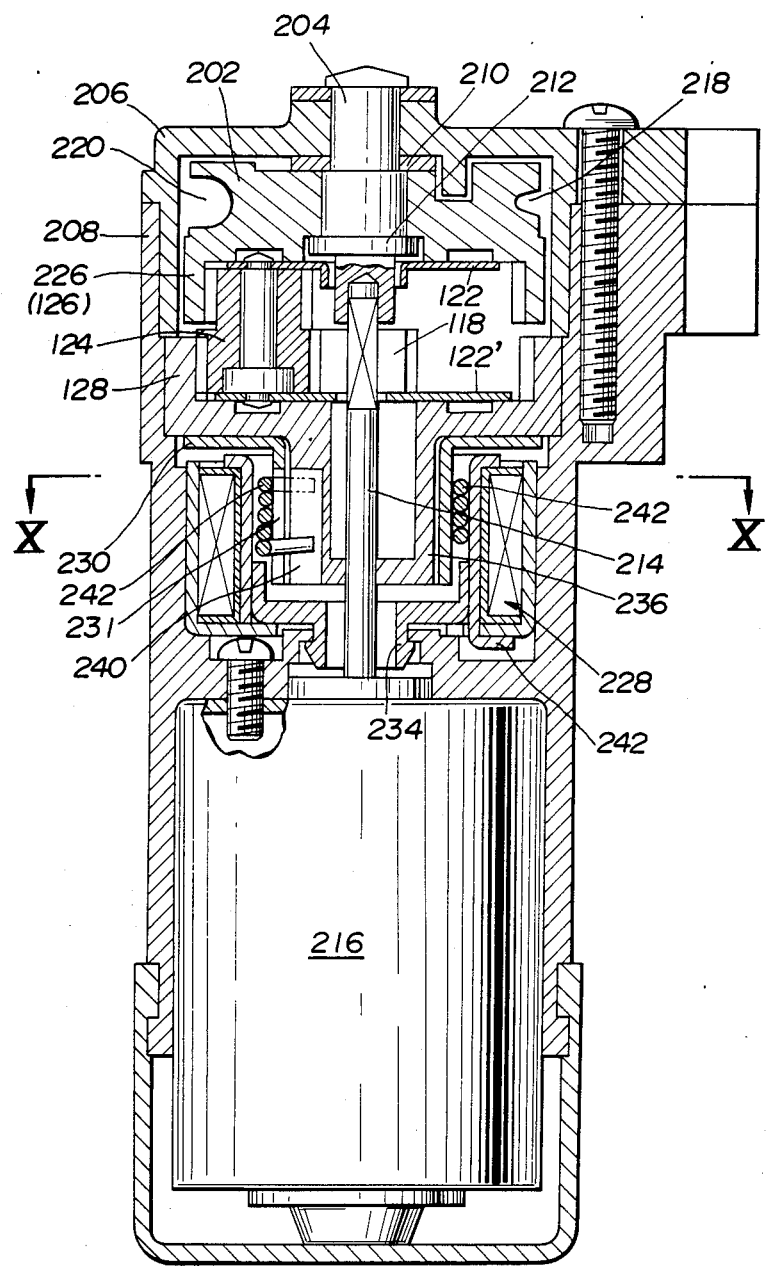
FIG. 9 is a vertical section of the control unit as seen along section line IX—IX of FIG. 6.
Figure 14:
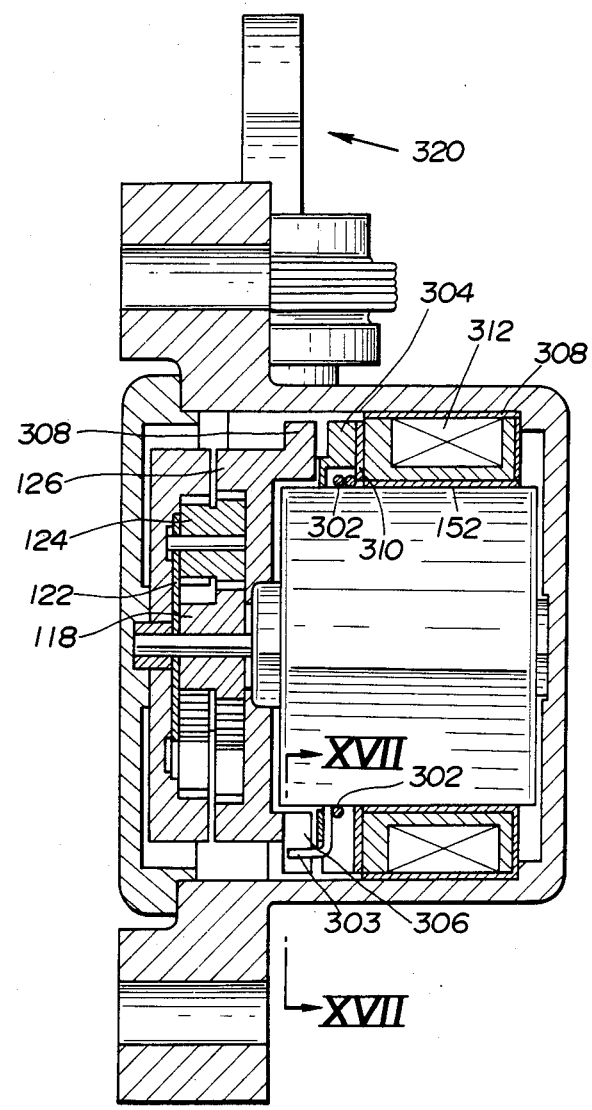
FIG. 14 is a sectional view as taken along section line XIV—XIV of FIG. 13.

In this embodiment the planetary gear unit is essentially the same as that used in the first embodiment and differs only in that two carriers 122, 122' are used to the support the pinion gears 124. The sun gear 118 as best seen in FIG. 9 is located between the two carriers 122, 122' which serve to increase the structural rigidity of the arrangement and hold the pinion gears steadily in place during operation. The bore in the sun gear 118 is formed with flat surfaces which cooperate with corresponding surfaces formed on the input shaft 214 to render the two elements synchronously rotatable.

The rotatable member 202 is formed with an integral dependent flange 226 which is formed with teeth along the inner periphery thereof to define the second of the two ring gears (128) of the planetary gear unit.

The clutch arrangment interconnecting the motor and the planetary gears includes an annular solenoid coil/bobbin/field core arrangement 228 similar to that used in the first embodiment. However, in this case the coil is not disposed about the motor in order to reduce the thickness (diameter) of the actuator casing. This clutch arrangement includes a two stage engagement arrangement and comprises an armature 230 having a radially extending flange section and a tubular or cylindrical portion formed with an axial extending slot or cut-out 231. The armature 230 is formed of a ferromagnetic material and arranged to be attracted to an annular yoke 232 disposed about the inner periphery of the field core. Upon energization of the solenoid coil the armature 230 is rendered stationary within the actuator housing. The yoke 232 is secured in place by a grommet member 234.

The first ring gear 126 of the planetary gear train is formed with a hollow cylindrical section 236 which extends coaxially through the armature element 230. This ring gear is arranged to seat on a shoulder 238 defined within the housing in a manner which supports the same in a predetermined position wherein a predetermined amount of play between the ring gear 126 and the armature 230 is permitted. The hollow cylindrical section 236 is formed with a sectoral recess 240 which cooperates with the slot 231 formed in the armature 230 (see FIG. 10). A coil spring 242 is disposed about the periphery of the cylindrical portion of the armature 230. This spring is formed with two leg portions which extend radially inward and which project though the slot 231 on the armature and terminate in the sectoral recess 240 formed in the hollow cylindrical portion of the second ring gear. The spring 242 is arranged to have an outer diameter which in an undistorted state is smaller than the internal diameter of the yoke.

Figure 11:
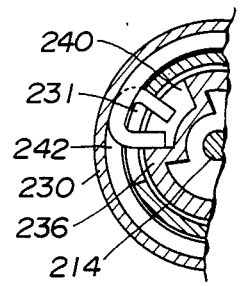
FIG. 11 is a sectional view similar to that shown in FIG. 10 which shows the clutching effect which occurs during the operation of the second embodiment.

When the clutch is engaged by passing a current through the solenoid coil, the armature 230 becomes attached to the yoke 232 in a manner which renders it stationary. By supplying the motor with current in a manner which causes it to rotate the input shaft in a selected one of the two rotational directions, the first and second ring gears tend to be caused to be rotated in opposite rotational directions. At this stage the springs of the latch mechansims 102, 104 tend to prevent the rotation of the second ring gear. This produces a temporary reaction which tends to induce rotation of the first ring gear 126. However, as the rotation of the armature 230 is prevented, movement of the first ring gear 126 (as shown in FIG. 11) in the clockwise direction (merely by way of example) causes a distortion of the coil spring 242 in manner that it changes shape and enages the inner periphery of the yoke 232. This produces a clutching effect which renders the first ring gear 126 stationary thus establishing a positive reaction which induces the second ring gear 128 to be positively driven by the power input of the motor and thus wind a selected one of the cable inners onto the rotatable member 204.

Figure 8:
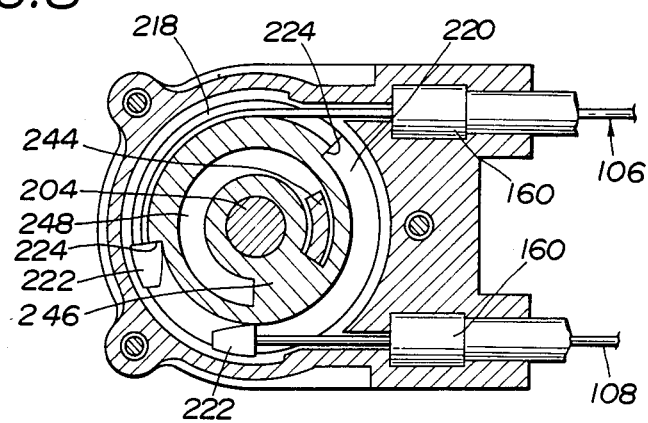
FIG. 8 is a sectional plan view showing the actuator in an operative condition.
Figure 10:
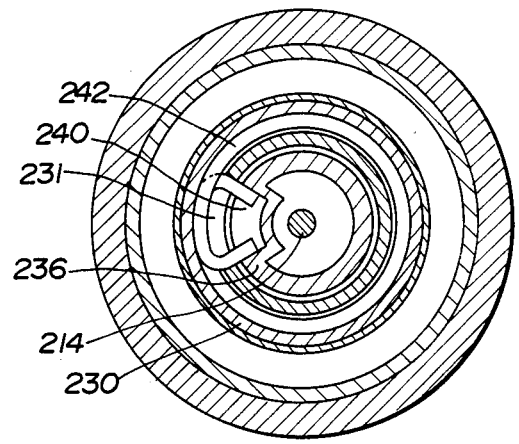
FIG. 10 is a sectional view taken along section line X—X of FIG. 9.

In order to terminate the energization of the solenoid coil and motor, a limit switch may be deployed in a manner similar to the first embodiment. In this embodiment is is possible to dispose a simple strain gauge or the like in a projection 244 which depends from the inner surface of the cap member 206 and which is arranged to limit the degree by which the rotatable member 244 may actually rotate in either direction. For example, as shown in FIG. 8, upon a web 246 which extends across a section of a circular groove 248 formed in the top of the rotatable member 204, engaging the projection, the stress generated in the projection 244 may be used to indicate that the rotatable member 244 has rotated sufficiently to operate either of the two remote devices and thus be used to stop the motor and de-energize the solenoid coil. Alternative arrangements will be apparent to those skilled in the art.

As will be understood, upon the first ring gear 126 being rendered rotatable, the transmission of torque through the planetary gear unit becomes impossible. This of course permits the spring or springs of the activated device to pull the cable inner back toward its home position thus rotating the rotatable member 204 back to the position shown in FIG. 7 by way of example.

In this embodiment as the cable inners are wound on the rotatable member very little space is required and the unit can be rendered compact. Further, the use of the two stage clutch reduces the need to use a large relatively powerful solenoid to hold the first ring gear stationary. Viz., all that is nessary is sufficient force to hold the armature 230 stationary until the coil spring 242 can be distorted in response to the mutual rotation between the armature 230 and the hollow cylindrical portion 236 of the first ring gear, and enagage the inner wall of the stationary yoke 232 to produce a clutching action sufficiently strong to hold the first ring gear 126 stationary while one of the remote devices is being actuated.

THIRD EMBODIMENT

FIGS. 12 to 18 show a third embodiment of the present invention. This arrangement is basically similar to the first embodiment but is adapted to operate a remote device or devices via a push-pull action and is equipped with clutch of the nature used in the second embodiment.

FIG. 12 shows in exploded view form the construction of a two stage or double action clutch arrangement which enables the use of a relatively small power economical solenoid to be used. This arrangement is basically the same as that used in the second embodiment and differs in that the spring 302 is arranged to have legs 303 which extend parallel with the axis of rotation of the first and second ring gears 126, 128 (only the first one is shown). To accomodate the spring 302 an armature 304 is formed with recesses in which the spring can seat and through which the spring legs can project to be received in a recess 306 formed in a flange 308 formed on the first ring gear 126. The compactness which can be achieved with this arrangement will be appreciated from the cross-sectional view shown in FIG. 14.

To ensure that a good clutching action occurs between the aramature 304 and the top of a field core 308, a ferromagnetic washer-like clutch disc 310 is fixed to the lower surface of the armature. This provison permits the main body of the armature to be formed of a suitable plastic if so desired.

When the solenoid coil 312 is energized to render the armature 304 stationary, the mutual rotation which is induce between it and the first ring gear 126 (see FIGS. 17, 18) causes a distortion of the spring 302 in a manner that it engages the casing 312 of the motor and establishes a positive clutching action which renders the first ring gear 126 stationary.

Figure 15:
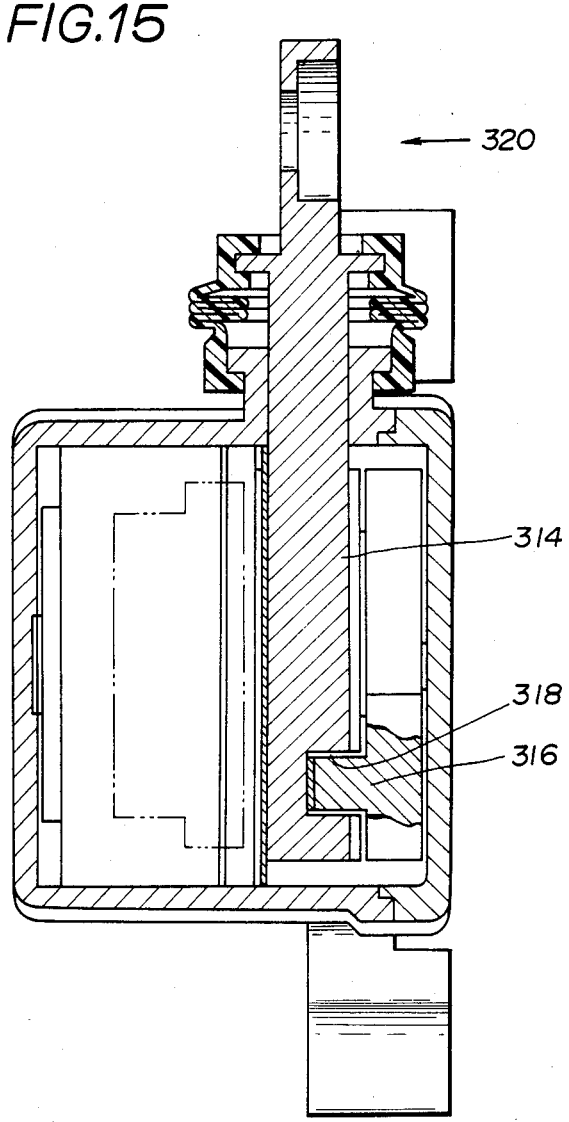
FIG. 15 is a sectional view as taken along section line XV—XV of FIG. 13.
Figure 16:
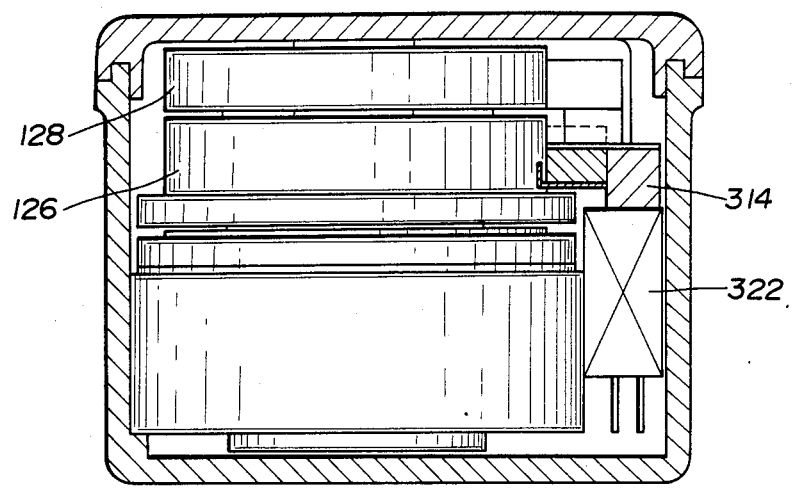
FIG. 16 is a sectional view as seen along section line XVI—XVI of FIG. 13.
Figure 17:
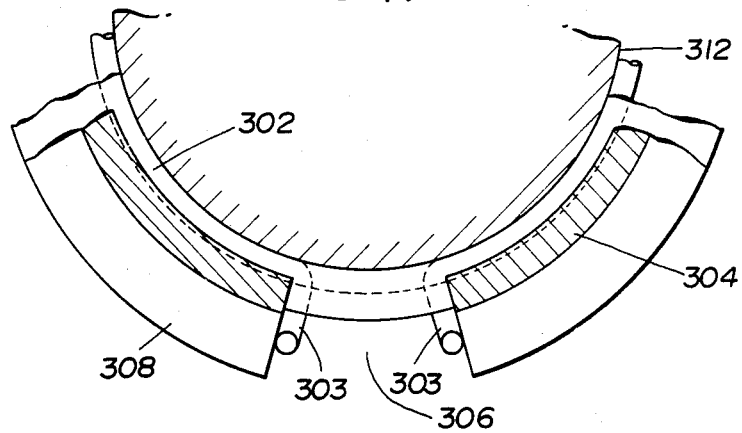
FIGS. 17 and 18 are sectional views taken along section line XVII—XVII of FIG. 14.
Figure 18:
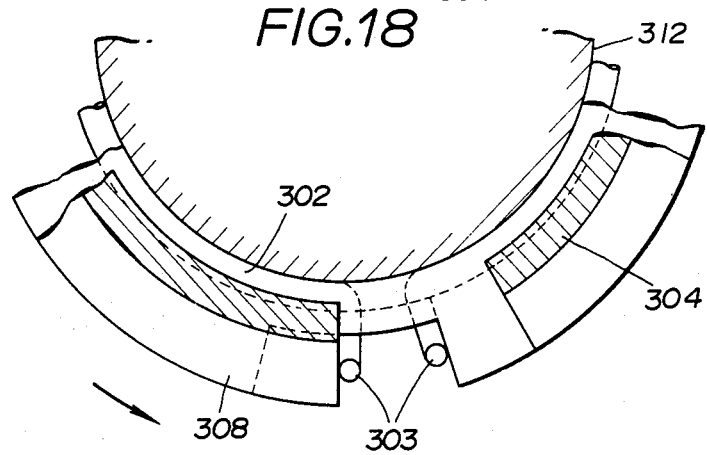

In this embodiment as there is only one slide member 314 that need be moved, the lug or projection 316 which depends from the first ring gear 126 is arranged to project into a recess 318 formed in the slide member 314 as shown in FIG. 15. It will also be noted from this figure that the slide member 314 is arranged to be elongate and project out of the actuator housing.

In order to faciliate connection of a cable, lever or the the like in this embodiment the side member 314 is formed with a circular apertured section 320 at the end thereof (see FIG. 13.)

To facilitate the timely termination of motor and clutch operation, a position or limit switch 322 (see FIG. 16) is disposed with the slide member 314 and arranged so that upon the first ring gear 126 rotating sufficiently to drive the slide member 314 to either end of the track arrangement in which it is slidably received, it produces a signal which is used to stop the supply of electrical current to the motor and clutch.

This embodiment is deemed useful with arrangements such as door lock and the like wherein a locking action of the device (merely by way of example) is achieved by inducing the second ring gear to rotate in the clockwise direction (as shown in FIG. 13) which drives the slide member upwardly to the position indicated in phantom in this figure and in which position the slide member may be left until such time as it is required to reverse the procedure, i.e. unlock the lock. This latter mentioned requirement of course can be achieved by operating the motor in the reverse rotational direction, viz., a direction which induces the second ring gear to rotate in the counter-clockwise direction and which pulls the slide member from the position shown in phantom in FIG. 13 back down to the one shown in solid line.

As will be appreciated, upon movement of the slide member 314 to one of its extreme positions de-energization of the motor and clutch leaves the planetary step-down gear in a state wherein no bias is applied to the slide member and thus it can remain in the position to which it was moved prior the de-energization. Alternatively, is so desired the slide member can be biased back to another position under the influence of a biasing force produced in the device which is actuated by the actuator.

FOURTH EMBODIMENT

Figure 19:
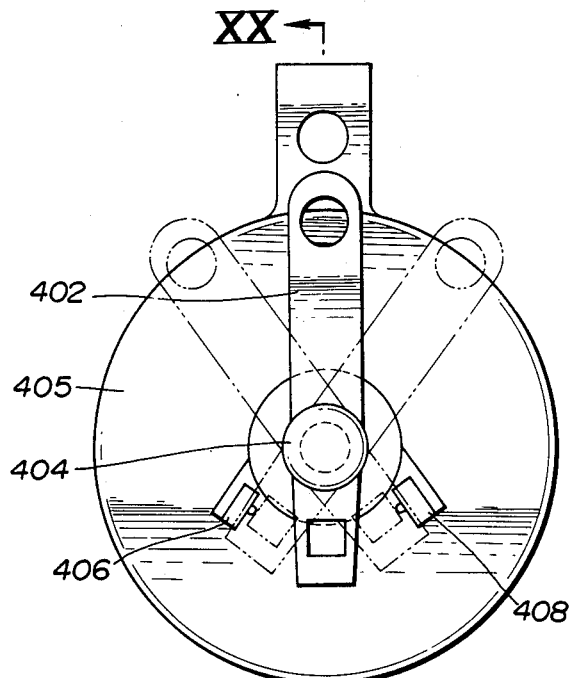
FIG. 19 is a plan view of a fourth embodiment showing the movement of an arm of thereof.
Figure 20:
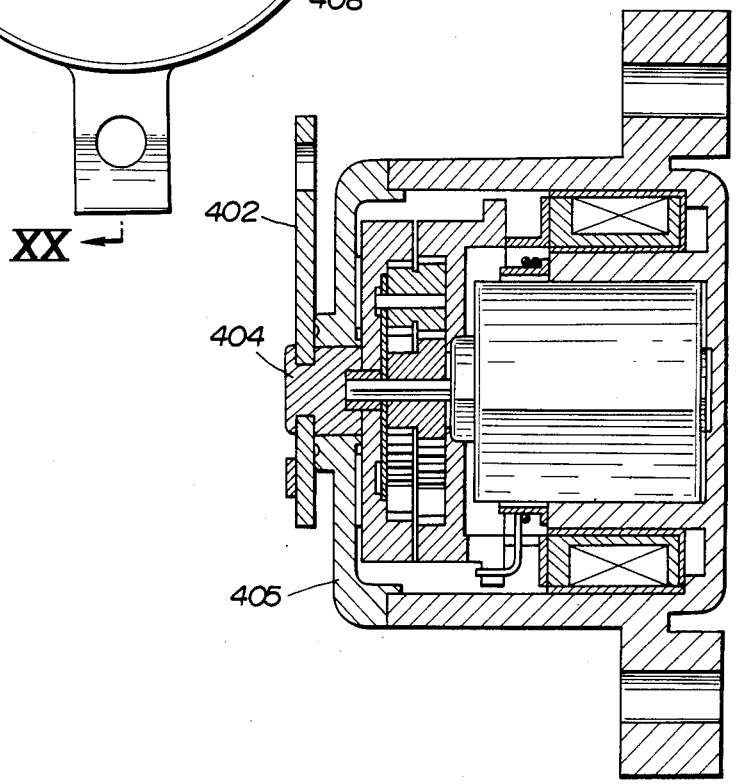
FIG. 20 is a sectional elevation of the fourth embodiment of the present invention taken along section line XX—XX of FIG. 19.

FIGS. 19 and 20 show a fourth embodiment of the present invention. This embodiment is characterized by the provision of a lever 402 which arranged externally of the actuator casing or housing and which is connected with the boss 404 which projects through a circular aperture formed in the cap 405 of the actuator. The boss 404 is connected with the second ring gear 128 for synchronous rotation therewith.

As will be appreciated from FIG. 19, with this embodiment the lever 402 is arranged to be selectively pivoted from a home position (shown in solid line) to either one of two actuating positions. Hence, this device can be used to operate two different mechanisms given that the appropriate lost motion connections are provided between the cables or like elements and the lever. Alternatively, it is also possible to use this arragement to lock/unlock a single door lock arrangement or the like.

To stop the motion of the lever upon the latter reaching the end of its stroke (in either direction) limit switches 406, 408 are provided on the cap 405 in a manner such as shown in FIG. 19.

The construction and operation of the clutch and step-down gearing is essentially as described hereinbefore in connection with the first and second embodiments and hence no description of the same will be given for brevity.

What is claimed is:
1. An actuator for operating a remote device comprising:
   a rotatable member;
   a motor having a shaft, said motor being energizable to drive said shaft in first and second rotational directions;
   a reduction gear operatively interposed between said motor and said rotatable member; and
   a clutch;
   said reduction gear comprising:
   a first ring gear operatively connected with said clutch for being selectively rendered stationary with respect to a housing of said actuator;
   a second ring gear connected with said rotatable member for rotation therewith;
   a carrier;
   pinion gears rotatably supported on said carrier, said pinion gears each having a first section which meshes with said first ring gear and a second portion which meshes with said second ring gear; and
   a sun gear, said sun gear being in drive connection with the shaft of said motor.

2. An actuator as claimed in claim 1, wherein said first diameter portions are larger in diameter than the second diameter portions.

3. An actuator as claimed in claim 1, wherein said clutch comprises:
   a first rotatable element, said first element being connected with said first ring gear;
   a second rotatable element;
   means for selectively connecting said second element with a stationary structure of said actuator;
   a resilient member arranged with said first and second elements so that mutual rotation between said first and second elements causes said resilient member to distort and engage said stationary structure in a manner which renders said first element stationary until said selectively connecting means renders said second rotatable element rotatable with respect to said stationary structure of said actuator.

4. An actuator for operating a remote device comprising:
   a rotatable member;
   a motor having a shaft, said motor being energizable to drive said shaft in first and second rotational directions;
   a reduction gear operatively interposed between said motor and said rotatable member; and
   a clutch which selectively establishes a drive connection between said rotatable member and said shaft through said reduction gear when engaged, said clutch comprising:
   a first rotatable element, said first element being connected with a gear element of said reduction gear;
   a second rotatable element;
   means for selectively connecting said second element with a stationary structure of said actuator;
   a resilient member arranged with said first and second elements so that mutual rotation between said first and second elements causes said resilient member to distort and engage said stationary structure in a manner which renders said first element stationary until said selectively connecting means renders said second rotatable element rotatable with respect to said stationary structure of said actuator.

5. An actuator for operating first and second independent remote devices, comprising:
   a rotatable member;
   a first flexible cable, said first cable having a first end operatively connected to said rotatable member and a second end operatively connected to said first remote device;
   a second flexible cable, said second cable having a first end operatively connected to said rotatable member and a second end operatively connected to said second remote device;
   said first and second cables being operatively connected at their respective first ends to said rotatable member in a manner that rotation of said rotatable member in a first rotational direction causes said first cable to be moved in a direction which activates said first remote device independently of said second remote device and rotation of said rotatable member in a second rotational direction causes said second cable to be moved in a direction which activates said second remote device independently of said first remote device;

a clutch; and a motor arrangement operatively connected with said rotatable member through said clutch, said motor arrangement being selectively energizable to drive said rotatable member in said first and second rotational directions.

6. An actuator for operating first and second remote devices, comprising:

a rotatable member;

a first flexible cable, said first cable having a first end operatively connected to said rotatable member and a second end operatively connected to said first remote device;

a second flexible cable, said second cable having a first end operatively connected with said rotatable member and a second end operatively connected with said second remote device;

said first and second cables being operatively connected at their respective first ends to said rotatable member in a manner that rotation of said rotatable member in a first rotational direction causes said first cable to be moved in a direction which activates said first remote device and rotation of said rotatable member in a second rotational direction causes said second cable to be moved in a direction which activates said second remote device; and a motor arrangement operatively connected with said rotatable member through said clutch, said motor arrangement being selectively energizable to drive said rotatable member in said first and second rotational directions;

wherein said motor arrangement includes:

a reversible motor; and a clutch arrangement for selectively connecting said motor with said rotatable member.

7. An actuator as claimed in claim 6, wherein said motor arrangement further includes a reduction gear operatively interconnecting said clutch arrangement and said rotatable member, said reduction gear multiplying the torque applied to said rotatable member by said motor.

8. An actuator as claimed in claim 7, wherein said reduction gear takes the form of a planetary gear set having:

a sun gear;

a carrier;

pinion gears rotatably supported on said carrier and in mesh with said sun gear;

a first ring gear in meshing engagement with said pinion gears, said first ring gear being connectable with a stationary structure through said clutch arrangement; and a second ring gear in meshing engagement with said pinion gears, said second ring gear being connected with said rotatable member so as to be rotatable therewith.

9. An actuator as claimed in claim 8, wherein said pinion gears have first and second diameter portions, said first diameter portions meshing with said first ring gear and said second diameter portions meshing with said second ring gear.

10. An actuator as claimed in claim 9, wherein said first diameter portions are larger in diameter than the second diameter portions.

11. An actuator as claimed in claim 6, wherein the first ends of said first and second cables are connected with said rotatable member through first and second lost motion connections respectively, said first lost motion connection being such as to cause said first cable to be moved in its activating direction when member rotates in said first rotational direction and said second lost motion connection being such as to cause said second cable to move in its activating direction when said member rotates in said second rotational direction.

12. An actuator as claimed in claim 6, wherein said rotatable member takes the form of a rotatable member having an lug portion depending therefrom, and which further comprises first and second slide members, said first and second slide members being disposed in first and second tracks respectively, and connected with said first and second cables, said first slide member having a first section which is engageable with said lug portion when said rotatable member rotates in a first rotational direction in a manner which moves said first slide member in said first track in a direction which pulls said first cable in a direction which activates said first remote device, said second slide member having a second section which is engageable with said lug portion when said rotatable member rotates in a second rotational direction in a manner which moves said second slide member in said second track in a direction which pulls said second cable in a direction which activates said second remote device.

13. An actuator as claimed in claim 6, wherein said rotatable member takes the form of a disc having a peripheral edge, said peripheral edge being formed with a groove in which said first and second cables are receiveable, said disc being formed with a cut-out section which defines first and second steps in said peripheral edge, said first step engaging an end portion of said first cable when said rotatable member rotates in said first rotational direction in a manner which causes said first cable to be drawn onto and tend to wind around said member and thus caused to be moved in its activating direction, and said second step engaging an end portion of said second cable when said member rotatable rotates in said second rotational direction in a manner which causes said second cable to drawn and tend to wind onto said said member and thus caused to be moved in its activating direction.

* * * * *